United States Patent [19]
Weller et al.

[11] 3,884,455
[45] May 20, 1975

[54] HIGH EFFICIENCY ENERGY ABSORBER

[75] Inventors: Peter A. Weller; Cass V. Curtis, both of Durham, N.H.

[73] Assignee: McCord Corporation, Detroit, Mich.

[22] Filed: Mar. 29, 1973

[21] Appl. No.: 345,915

Related U.S. Application Data
[63] Continuation-in-part of Ser. No. 245,438, April 19, 1972, abandoned.

[52] U.S. Cl. ................................. 267/140; 293/88
[51] Int. Cl. ........................... F16f 1/36; B60r 19/06
[58] Field of Search .......... 267/63 R, 140, 141, 145, 267/153, 181; 293/71 R, 85, 88; 248/22, 358 R; 114/219; 213/40 R, 40 S

[56] References Cited
UNITED STATES PATENTS

| | | | |
|---|---|---|---|
| 2,534,137 | 12/1950 | Lewis | 248/358 R |
| 3,049,344 | 8/1962 | Hawkins | 248/358 R |
| 3,603,350 | 9/1971 | Monroe | 267/153 |
| 3,633,934 | 1/1972 | Wilfert | 293/88 |
| 3,694,018 | 9/1972 | Levering | 293/88 |
| R27,318 | 3/1972 | Gensheimer | 267/140 |

FOREIGN PATENTS OR APPLICATIONS

| | | | |
|---|---|---|---|
| 1,090,035 | 9/1960 | Germany | 267/63 R |
| 851,152 | 10/1960 | United Kingdom | 267/63 R |

Primary Examiner—Evon C. Blunk
Assistant Examiner—Robert Saifer
Attorney, Agent, or Firm—McGlynn and Milton

[57] ABSTRACT

This invention relates to a high efficiency energy absorbing member or block including integral columnar ribs disposed longitudinally thereof on at least one surface and to energy absorbing devices including such a member. A particular device which may embody such a block includes a piston means, cylinder means slidably disposed about the piston means, and a block of energy absorbing material disposed therebetween for restraining inward axial motion.

6 Claims, 11 Drawing Figures

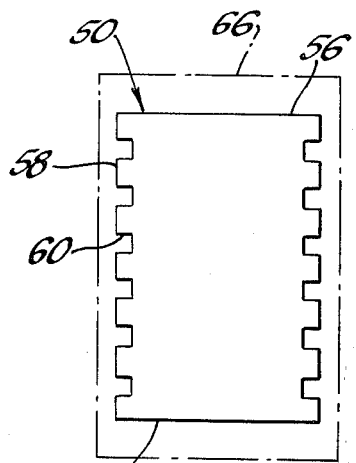
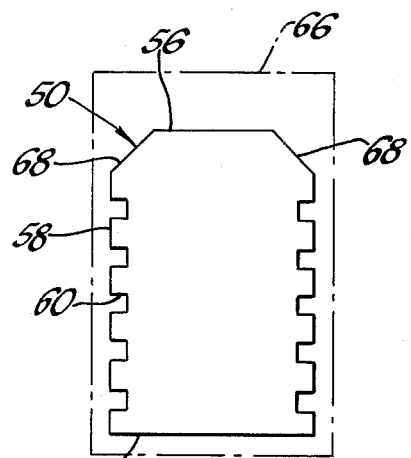
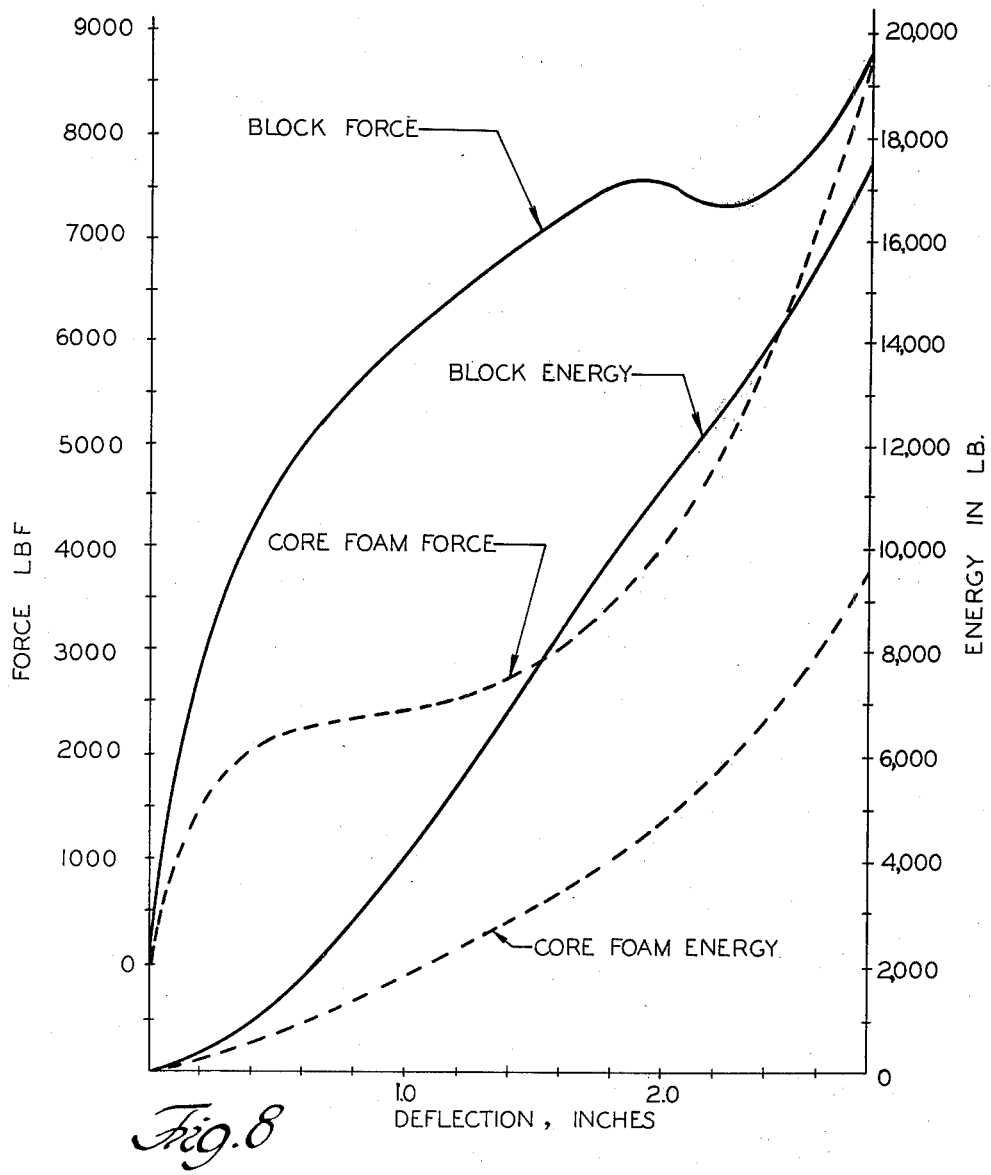

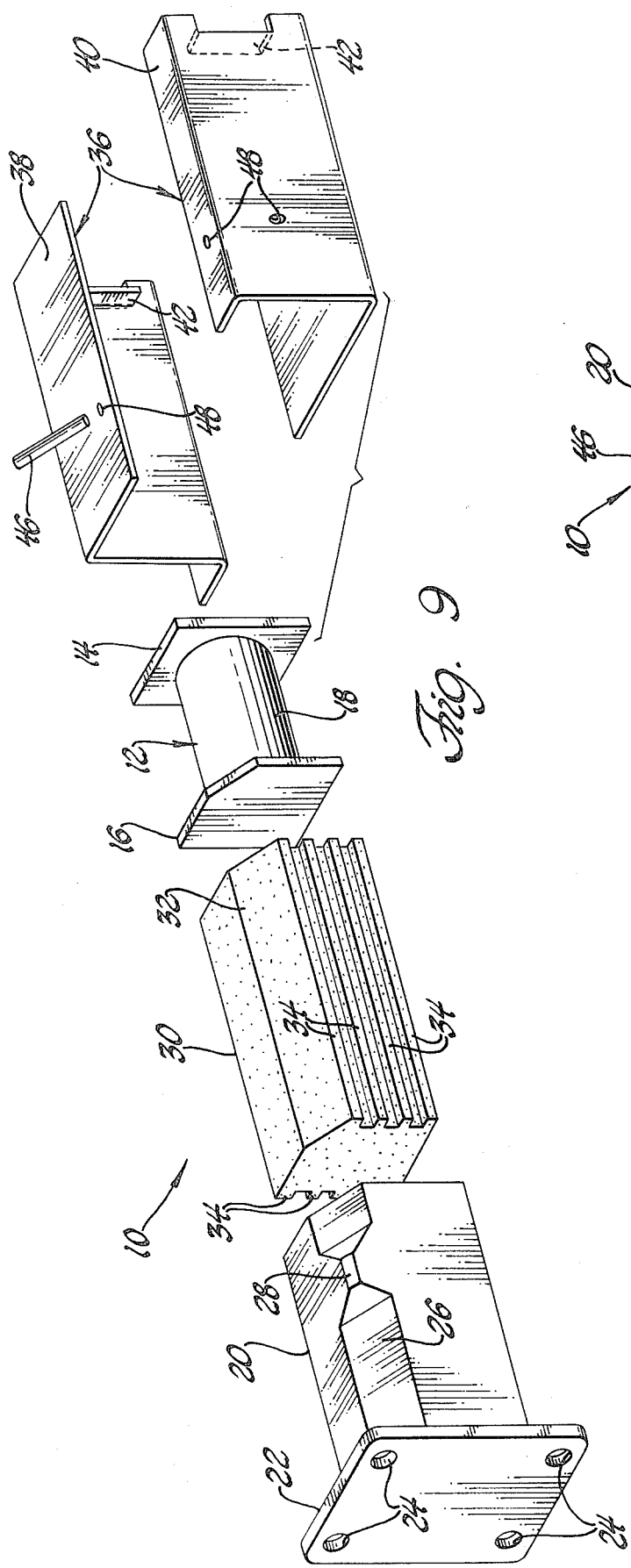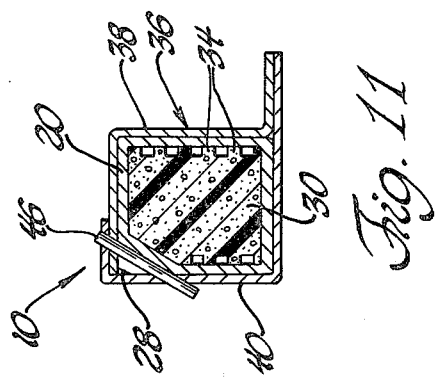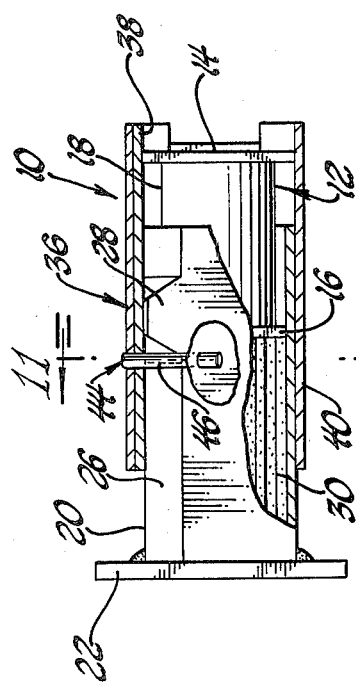

HIGH EFFICIENCY ENERGY ABSORBER

This application is a continuation-in-part of application Ser. No. 245,438 filed Apr. 19, 1972, now abandoned.

This invention relates to a high efficiency energy absorbing member or block which is adapted to absorb the energy of an impact such as a low velocity automobile crash. The invention further relates to energy absorbing devices such as bumpers or devices adapted to be used in conjunction with bumpers and including such high efficiency energy absorbing members or blocks.

Although the invention will be discussed specifically with respect to members and devices adapted to be employed in conjunction with automobile bumpers, it is not to be implied that the energy absorbing blocks or devices of the instant invention are restricted to this limited application; on the contrary, the invention has applicability to any situation wherein it is desirable to absorb energy produced by an impact, such as between a bumper or platform and a substantially rigid frame or support structure.

The prior art includes many energy or shock absorbing devices which are adapted to be included as a part of a bumper or which are adapted to be used in conjunction with automobile bumpers. However, the prior art devices suffer from a number of deficiencies including excessive cost, lack of efficiency, failure from fatigue or corrosion, and variations of energy absorbing properties with variations in temperature. While the prior art does include devices which do act as efficient energy absorbing members, these devices, such as hydraulic absorbers, often times are not economical for production purposes and due to their nature may be subject to mechanical failure. Many other energy absorbing devices disclosed in the prior art are, in view of the size of the member necessary to absorb the impact, less efficient than desirable for use in conjunction with bumper assemblies for the present day automobile. Still other energy absorbing devices such as the coil spring, suffer from the disadvantage of failure due to fatigue or corrosion after a period of time. Those members which embody resilient materials acting as energy absorbing members, tend to suffer from a lack of efficiency in absorbing impact energy as well as from a variation of energy absorbing properties with temperature. It is easy to appreciate that the snow and ice brought on by cold weather increases the number of minor collisions and it is therefore important to have the optimum effectiveness of an energy absorbing device available during this time. Thus, these temperature variations may present a considerable problem.

It is, therefore, an object and feature of the instant invention to provide a high efficiency energy absorbing member or device of the type which may be adapted to be included in an automobile bumper or used in conjunction with bumpers for motor vehicles, the device comprising an energy-absorbing material including integral columnar ribs disposed longitudinally on at least one surface thereof and the ribs being adapted to increase the compressive strength of the material in the longitudinal direction thereof.

It is a further object of the invention to provide an energy absorbing device including a block of energy absorbing material which is substantially rectangular in cross-section and which has optimal dimensional characteristics for attaining the most efficient energy absorbing properties possible.

It is a still further object and feature of the instant invention to provide an energy absorbing device of the type which may be adapted to be used in conjunction with bumpers for motor vehicles comprising piston means, cylinder means slidably disposed about said piston means, and temperature responsive resilient means or compressible energy absorbing material disposed therebetween for restraining inward axial motion to provide a substantially temperature independent energy absorbing device.

It is an even still further object and feature of the instant invention to provide an energy absorbing device wherein the resilient means or compressible energy absorbing material is a substantially stable material which resists fatigue and corrosion.

Other features and attendant advantages of the instant invention will be readily appreciated by those skilled in the art as the same becomes better understood by reference to the following detailed description when considered in connection with the accompanying drawings wherein:

FIG. 6 shows a block of compressible energy absorbing material including columnar ribs, the block being disposed within an enclosure;

FIG. 7 shows a block within an enclosure as in FIG. 6, but indicating a manner of varying the shape of the block to accommodate available clearances;

FIG. 8 shows a plot of force necessary to attain a given deflection of the compressible energy absorbing material employed in the devices of the invention as well as a plot of the energy absorbed by such compressible energy absorbing material at a given deflection;

FIG. 9 is an exploded view of a specific energy absorbing device including the columnar ribbed block of FIGS. 1 through 7;

FIG. 10 is a cross-sectional, partially cut-away view of such an energy absorbing device as shown in FIG. 10; and, FIG. 11 is a cross-sectional view taken along line 11—11 of FIG. 10.

Figure 1:
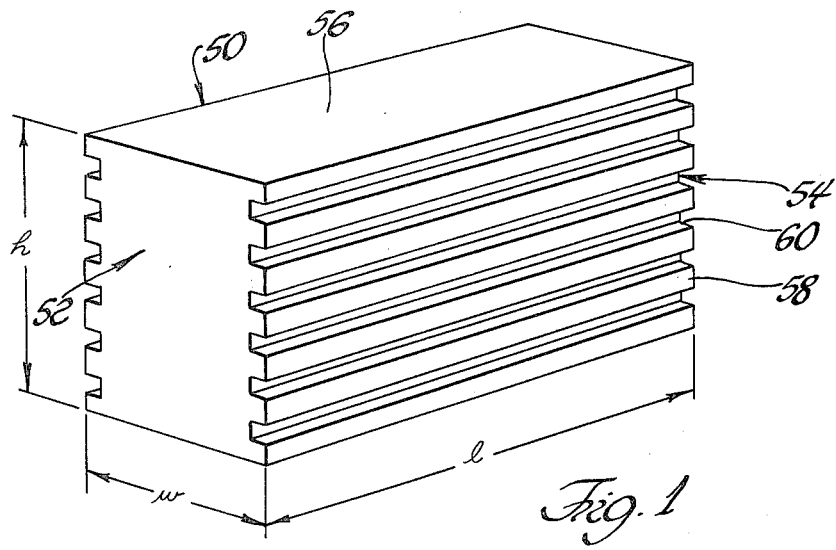
FIG. 1 is a perspective view of a block of compressible energy absorbing material including columnar ribs on two surfaces thereof in accordance with the invention.

It will be appreciated that the energy absorbed by a compressible energy absorbing material such as a block of elastomeric plastic material, for instance a block of polyurethane foam, positioned between the frame and the bumper of an automobile is the integral of the force times the deflection or $E = \int F dS$ where $E =$ the energy, $F$ is the instantaneous force and $S$ is the deflection or stroke. In order to attain the above objective of high efficiency for such an energy absorbing material, it is desirable to minimize the maximum force as well as the total deflection. To do so requires that the force necessary to cause a given deflection rise rapidly to near maximum in the early portion of the deflection curve and then remain relatively constant throughout the remainder of the deflection. The solid line designated as block force in FIG. 8 shows a deflection curve for a preferred block of compressible energy absorbing material of this invention. It will be noted that the necessary force for a given deflection rises very rapidly for a small deflection.

The preferred material for forming the blocks of compressible energy absorbing material of the invention is microcellular polyurethane foam which may be compounded and molded in accordance with the teachings of U.S. Pat. No. 3,575,896 to Khan. However, numerous formulations for the production of suitable microcellular polyurethane foams are well-known in the art. It is a basic characteristic of a simple block of microcellular polyurethane foam to show a tendency for early stiffness followed by a reduced rate of force increase as is desirable for attaining high efficiency energy absorbing characteristics. This is, at least in part, due to the integral skin formed on the periphery of the block of microcellular polyurethane form, the skin adding stiffness to the material and thereby resulting in high early modulus. However, even though such a block of microcellular polyurethane foam does exhibit the above-mentioned characteristics, it is desirable both from the point of view of economizing on the amount of foam necessary for absorbing a given amount of energy and from the point of view of attaining efficiencies comparable to known hydraulic absorbers, to modify the microcellular polyurethane blocks in the manner indicated in FIGS. 1 through 7 and as described in more detail hereinafter.

It has been found that by shaping the block of foam material appropriately, significant increases in efficiency can be achieved. Accordingly, the instant invention relates to an energy absorbing device comprising a compressible energy-absorbing material including integral columnar ribs disposed longitudinally on at least one surface thereof, said ribs being adapted to increase the compressive strength of the material in the longitudinal direction thereof. The preferred embodiment of the energy-absorbing material for inclusion in the energy absorbing devices of the invention is generally shown at 50 in FIGS. 1 through 7. The material is in the form of a block of substantially rectangular cross-section and the block has dimensions of width $w$, height $h$ and length $l$ as shown on each of the FIGS. 1 through 3. The block 50 includes, of course, three pairs of faces disposed in parallel relationship and generally indicated at 52, 54 and 56. The columnar ribs 58 are disposed on faces 54 which are defined by dimensions $l$ and $h$ and these ribs extend in parallel relationship in the direction of the $l$ dimension of the block. Grooves 60 are disposed between the columnar ribs 58 and are also in parallel relationship running longitudinally of the block 50. Of course, as shown clearly in FIGS. 1 and 3 the surfaces 56 defined by $l$ and $w$ are planar.

Figure 3:
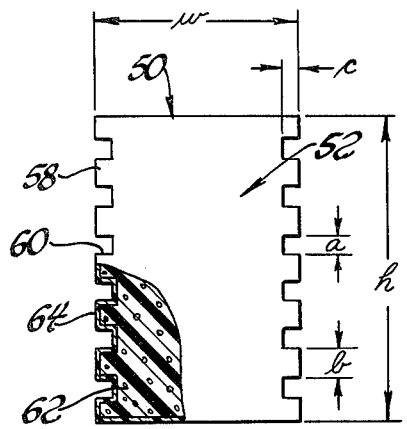
FIG. 3 is a sectional view of the block shown in FIG. 2 taken along line 3—3 thereof.

As shown in FIG. 3, the columnar ribs have a width $b$ and a depth $c$ and are spaced from each other by a distance $a$, the width of the grooves 60. As also shown in FIG. 3, in the broken-away section thereof, the block of compressible energy absorbing material may be formed of an elastomeric plastic material such as microcellular foam. As noted above, such a foam includes an integral skin on the surface thereof which adds to the stiffness and energy absorbing efficiency of the block. This integral skin is shown at 64.

Figure 2:
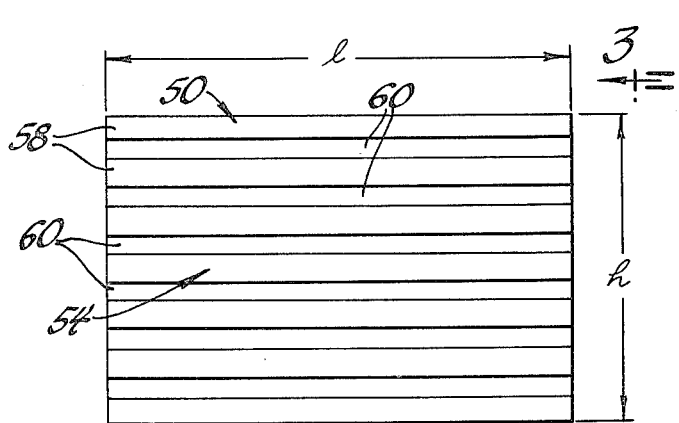
FIG. 2 is a plan view of a ribbed surface of the block of FIG. 1.
Figure 4:
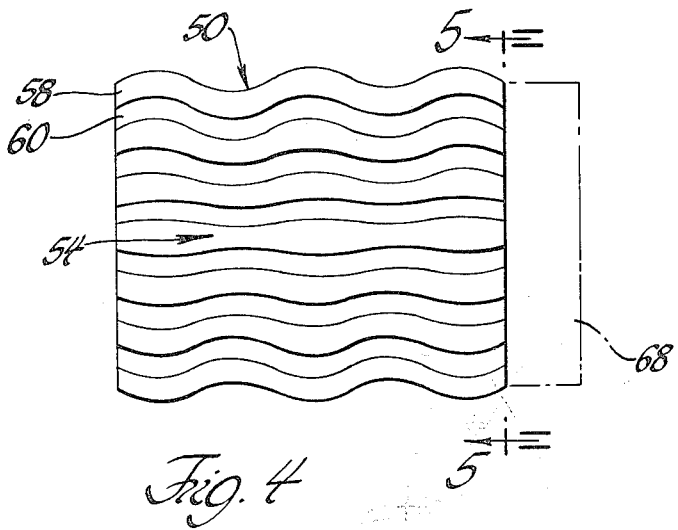
FIG. 4 shows an upper plan view of a ribbed surface of the block shown in FIG. 1 after said block has been impacted so as to cause the ribs to take on a wave-like configuration.
Figure 5:
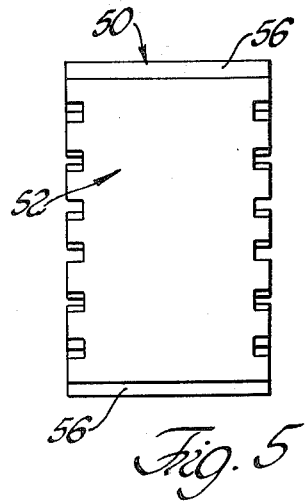
FIG. 5 is a sectional view of the block of FIG. 4 taken along line 5—5 thereof.

It has been found that optimum characteristics in terms of high efficiency energy absorption are obtained when the block has a configuration as shown in FIGS. 1 through 3. The result of this configuration is that the ribbed surfaces 54 do not readily buckle inwardly or outwardly upon impact of surface 52 due to the stiffening effect of the ribs 58 plus the stabilizing effect of the foam itself. The unribbed sides 56 extending in the longitudinal direction of the block are not ribbed so that local deformation can readily occur in the sideward direction as the rib columns are deformed. FIG. 4 shows the manner in which the ribbed sides 54 of the blocks 50 deform in a wave-like manner upon impact of surface 52 by a foreign body. The portion 68 shown in phantom indicates the original length of the block prior to the compression caused by impact. Thus, as the block is impacted, the foam is compressed, the ribs take on a wave-like configuration and the sides 56 tend to bulge out. The bulging of the sides 56 of the block can be seen in the cross-sectional view of FIG. 5.

In the preferred form of the block $w$ is smaller than $h$ for several reasons. First, to provide a relatively large ratio of skin perimeter to cross-sectional area. Of course, by making one side larger than another, the ratio of perimeter to cross-section area is increased. Secondly, it is desirable to have $w$ smaller than $h$ to maximize early stiffness of the block by increasing the ribbed length. Thirdly, it is desirable to make $w$ smaller than $h$ to enhance overall block rigidity in the direction of the unribbed sides and to thereby prevent gross column collapse or collapsing of the block in one large kink. It can be appreciated that if $h$ were smaller than $w$, there would be a greater tendency for the block to buckle from a given impact on surface 52 because of the lack of resistance to buckling due to the reduced surface area of ribs on the periphery of the block.

In addition to the above critera for the dimensions of the block, it is preferable that $a$, $b$ and $c$ be small relative to $w$, $h$ and $l$ and that $l$ be not greater than 2.5 times $w$ or less than 1.0 times $w$. It has been found that by maintaining the dimensions of the block within the above limits, the energy absorption properties and thus the efficiency of the compressible energy absorbing material is maximized.

Still more specifically, excellent results are obtained when $a = 0.25$, $b = 1.25$ to $1.50$ times $a$, $w = 0.65$ to $0.80$ times $h$ and $l = 1.15$ to $2.5$ times $w$. Still more specifically, it has been found that excellent results are obtained when using a block which has dimensions of 2¾ inches for $w$, 4 inches for $h$ and 6¼ inches for $l$.

As indicated previously, it is within the scope of this invention to employ the energy absorbing blocks of compressible material discussed above in various devices such as bumpers for absorbing energy or devices adapted to be used in conjunction with bumpers for automobiles. In the various environments in which the material might be employed, there may be various different clearances available for allowing the block to expand in the direction of sides 56 during compression. FIG. 6 shows a block 50 within an enclosure 66, the enclosure providing equal clearance for bulging of each of sides 56 of the block. The enclosure 66 of FIG. 7, on the other hand, provides a much greater clearance on one side of the block than the other, thus making it desirable that the block bulge during compresssion to a greater extent on the side 56 about which there is greater clearance. In order to achieve this bulging to a greater extent on one side than the other, it is merely necessary to chamfer at least one of the corners of the block on the side toward which the greater bulging is desired. Thus, as shown in FIG. 7, the block may be chamfered as at corners 68 which will cause the wave bulges to be emphasized to that side.

As discussed briefly above, FIG. 8 shows a plot of both block force and block energy for a preferred columnar ribbed block of the invention. For purposes of comparision, the graph also shows a plot of the force necessary for a given deflection of a piece of core foam not having ribbed surfaces and the absorption of energy by that core foam for a given deflection. It will be noted that the block having columnar ribs disposed on two surfaces absorbs nearly twice the energy that the core foam material without columnar ribs does, thus indicating a much greater efficiency for the ribbed blocks of the invention.

A specific energy absorbing device which may embody the above-discussed blocks is shown generally at 10 in FIGS. 9 through 11. The device 10 includes piston means generally indicated at 12 having a backer plate 14, a leader plate 16 and a member 18 which is circular in cross-section. The piston means is not restricted to this particular configuration and may take other forms as will become apparent in the following description.

A cylinder means 20 is slidably disposed about the piston means 12 and includes a mounting bracket 22 for mounting the bumper of a vehicle thereon. Bracket 22 may be adapted to receive any contact surface or it may act as the contact surface. Also, the bracket 22 may be welded to cylinder means 20 or attached thereto in any suitable manner. Holes 24 are provided which enable mounting of an automobile bumper. The cylinder means 22 is substantially rectangular in cross-section with a slideway 26 formed on one corner thereof by providing a flat section thereon. The slideway 26 includes an irregularity 28 in the shape of a ramp extending upwardly therefrom.

A temperature responsive means 30, such as the microcellular polyurethane foam block discussed above which tends to exhibit variations in flexibility due to temperature variations to a greater or less extent depending upon the formulation, is disposed between the leader plate 16 of the piston means 12 and the mounting bracket 22 of the cylinder means 20 for restraining inward axial motion. The block 30 is substantially rectangular in cross-section and is provided with a flattened corner 32 to correspond with the shape of the cylinder means 20 whereby the resilient means is adapted to fit snugly within the cylinder means. Notwithstanding the above discussion with respect to clearances when employing the energy absorbing blocks of this invention, when it is desired to overcome the variation of flexibility with temperature, a device such as this, wherein the block fits snugly within a retaining means, is desirable.

A housing member generally indicated at 36 encloses piston means 12 and holds the same against axial displacement. The housing member 36 is comprised of two shell portions 38 and 40 which are welded or otherwise secured together. The housing member includes interiorly extending flange elements 42 to which backer plate 14 of the piston means 12 abuts thereby preventing the piston means 12 from moving axially through the housing member 36.

Mechanical interlocking means generally indicated at 44 inclues a key 46 or pin which extends through holes 48 disposed on adjacent sides of the housing member 36. The key 46 registers with slideway 26 such that the irregularity 28 limits outward axial movement of the cylinder 20 with respect to the housing member 36. In assembling the device, elements are stacked in their proper order. Next, the stacked elements are pressed together causing the block 30 to be compressed, forcing the cylinder means 20 into the housing member 36 and moving the holes 48 to the left of the irregularity 28. In this position the key is forced through the holes and the compression force is released. The resilient means or block 30 forces the cylinder means 20 outwardly until the key 46 encounters the irregularity 28 as best shown in FIG. 10. The block 30 remains in a pre-loaded condition due to the interference of the key 46 and consequently the cylinder means 20 is forced against the corner of the housing member diagonally opposite the slideway 26 and frictionally engages the interior sides thereof. The cylinder 20 and the housing member 36 are thereby forced into tight metal to metal interengagement to prevent rattles and to provide a solid structure to allow an automobile having the device connected to the bumper to be jacked up.

The energy absorbing device 10 provides energy absorption in a number of ways. First of all, the stiffness of the block, which is improved by the columnar ribs as discussed above, must be overcome by the force acting on the cylinder means 20. Secondly, since the resilient means 30 is a block which fits snugly in the cylinder means there will be a bulging restraint; that is, when the resilient means or block is being compressed the walls of the cylinder means 20 will prevent the sides of the block 30 from bulging outwardly as they would normally do as discussed above. Energy absorption will also be provided by the frictional engagement between the sides of the cylinder means and the housing member 36.

Changes in temperature will obviously change the interaction of the three energy absorbing parameters discussed above when a microcellular polyurethane foam having temperature dependency is employed; however, with the proper selection of material and providing the right clearance in the contact area between the resilient means 30 and the cylinder means 20, the load absorbing capacity of the device as a unit will vary only slightly with temperature. In other words, if the temperature is reduced the friction and bulging restraint is reduced because the resilient means or block 30 tends to contract. However, the stiffness of the resilient means or block 30 is increased with reduced temperature and this stiffness thereby counteracts the other changes.

When the device is used for motor vehicles the pre-load on the resilient means or block 30 which causes the cylinder means 20 to be compressed into tight engagement with the housing member 36 prevents the device from rattling. Furthermore, if any part ever needs replacement it is only necessary to remove the key 46 and the entire device can be easily disassembled.

It is to be understood that the piston means 12 is not restricted to the configuration described, but may take a number of forms, the only requirement being that it be substantially stationary and held against axial movement. For example, the piston means 12 could be provided by extending the flange elements 42 axially; that is, providing arms extending toward the cylinder means 20 to engage the block 30, thereby eliminating the cylindrical member 18.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that the invention can be practiced within the scope of the appended claims otherwise than as specifically described herein.

The embodiments of the invention in which an exclusive property or priviledge is claimed are defined as follows:

1. An energy absorbing device comprising: a compressible energy-absorbing block having a substantially rectangular cross section; said block having dimensions of width $w$, height $h$ and length $l$; said block having integral columnar ribs disposed on two parallel, opposed faces of said block for increasing the compressive strength of said block in the longitudinal $l$ direction thereof; said faces being defined by the dimensions $l$ and $h$ and said ribs extend in parallel relationship to the direction of said $l$ dimension; said block including two parallel, opposed surfaces defined by the dimensions $l$ and $w$ and which are planar; said columnar ribs having a width $b$ and a depth $c$ and are spaced from each other by a distance $a$; said width $b$ being slightly greater than said distance $a$.

2. The device according to claim 1, wherein: $a$, $b$ and $c$ are small relative to $w$, $h$ and $l$; $w$ is smaller than $h$; and $l$ is not greater than $2.5w$ or less than $1.0w$.

3. The device according to claim 2, wherein: $a$ and $c$ are approximately 0.25 inches; $b$ equals $1.25a$ to $1.50a$; $w$ equals $0.65h$ to $0.80h$; and $l$ equals $1.15w$ to $2.5w$.

4. The device according to claim 3, wherein said compressible energy absorbing material is elastomeric plastic material having an integral skin on the surfaces thereof.

5. The device according to claim 4, wherein said elastomeric plastic material is microcellular polyurethane foam.

6. The device according to claim 2, wherein at least one of the lateral edges of said block is chamfered so as to cause said compressible energy absorbing material to bulge to a greater extent along the side on which the chamfered edge appears when said device is impacted in a direction parallel to said columnar ribs.

* * * * *